United States Patent [19]
Bussi et al.

[11] Patent Number: 5,916,945
[45] Date of Patent: Jun. 29, 1999

[54] ANTISTATIC AND ADHERENT COMPOSITIONS BASED ON POLYAMIDE

[75] Inventors: Philippe Bussi; François Fernagut, both of Bernay; Philippe Renouard, Brionne, all of France

[73] Assignee: Elf Atochem S.A., Puteaux, France

[21] Appl. No.: 08/768,832

[22] Filed: Dec. 18, 1996

[30] Foreign Application Priority Data

Dec. 19, 1995 [FR] France ................................. 95 15218

[51] Int. Cl.$^6$ ............................. C08K 3/26; B32B 27/00
[52] U.S. Cl. ............................................ 524/427; 428/421
[58] Field of Search ............................. 524/427; 428/421

[56] References Cited

U.S. PATENT DOCUMENTS

| | | | |
|---|---|---|---|
| 4,153,582 | 5/1979 | Puffr et al. | 252/511 |
| 4,337,179 | 6/1982 | Uejo et al. | 252/511 |
| 4,508,640 | 4/1985 | Kanda et al. | 524/441 |
| 4,971,726 | 11/1990 | Maeno et al. | 252/511 |
| 4,999,231 | 3/1991 | Fowler | 428/95 |
| 5,419,374 | 5/1995 | Nawrot et al. | 138/137 |
| 5,510,160 | 4/1996 | Jadamus et al. | 428/36.91 |

FOREIGN PATENT DOCUMENTS

| | | |
|---|---|---|
| 0297888 A1 | 1/1989 | European Pat. Off. . |
| 2007696 | 5/1979 | United Kingdom . |
| WO 94/25524 | 11/1994 | WIPO . |
| WO 94/29626 | 12/1994 | WIPO . |

*Primary Examiner*—Kriellion S. Morgan
*Attorney, Agent, or Firm*—Pennie & Edmonds LLP

[57] ABSTRACT

The present invention relates to antistatic and adherent compositions based on polyamide, which can be employed especially for the manufacture of composite materials and articles, such as multilayer pipes and/or conduits for conveying and/or storing hydrocarbons. The compositions contain carbon black and are employed for the production of pipes, containers and drums including:

- an inner layer in contact with the hydrocarbons, based on the said antistatic and adherent composition,
- a middle layer made of fluoropolymer, preferably of polyvinylidene fluoride, and
- an outer layer of polyamide, these layers being bonded to each other respectively by layers of adhesive binder. The invention also relates to a process for preparing these items.

20 Claims, 1 Drawing Sheet

ANTISTATIC AND ADHERENT COMPOSITIONS BASED ON POLYAMIDE

TECHNICAL FIELD

The present invention relates to antistatic and adherent compositions based on polyamide (PA), which can be employed especially for the manufacture of multilayer pipes and/or conduits for conveying and/or storing hydrocarbons.

BACKGROUND OF THE INVENTION

In motor vehicles, petrol travels at high speeds, under the effect of the injection pump, in conduits connecting the engine to the storage tank. In some cases the friction between petrol and the internal wall of the pipe can give rise to electrostatic charges the accumulation of which can result in an electrical discharge (spark) capable of igniting the petrol with catastrophic consequences (explosion). The surface resistivity of the inner face of the pipe must therefore be limited to a value which is generally lower than $10^6$ ohms. It is known to lower the surface resistivity of polymer resins or materials by incorporating therein conductive and/or semiconductive materials such as carbon black, steel fibers, carbon fibers or particles (fibers, platelets, spheres, etc.) which are metallized with gold, silver or nickel.

Among these materials, carbon black is employed more particularly, for reasons of economy and ease of processing. Apart from its special electroconductive properties, carbon black behaves as a filler such as, for example, talc, chalk or kaolin. A person skilled in the art thus knows that, when the filler content increases, the viscosity of the polymer/filler mixture increases. Similarly, when the filler content increases, the flexural modulus of the filled polymer increases. These known and predictable phenomena are explained in the "Handbook of Fillers and Reinforcements for Plastics", edited by H. S. Katz and J. V. Milewski, Van Nostrand Reinhold Company, ISBN 0-442-25372-9; see in particular Chapter 2, Section II for fillers in general, and Chapter 16, Section VI for carbon black in particular.

As for the electrical properties of carbon black, the technical note "Ketjenblack EC—Black 94/01" from the Akzo Nobel Company indicates that the resistivity of the formulation falls very abruptly when a critical content of carbon black, called a percolation threshold, is reached. When the carbon black content increases further, the resistivity decreases rapidly until it reaches a stable level (plateau region). For a given resin, therefore, it is preferred to operate in the resistivity plateau region, where an error in metering will only slightly affect the resistivity of the compound. Moreover, metering of products of very low apparent density, like carbon black, is not easy and an error in the metering of the black is always possible.

At present, polyamide pipes are commonly employed for conveying petrol in motor vehicles. In fact, polyamides represent an ideal material for the manufacture of pipes because their mechanical strength is excellent and their flexibility is sufficient for a pipe to withstand, without breaking, practically throughout the life of a vehicle, the accumulation of flexing motions, especially at low temperature. The applicants have found that, in the case of polyamide 12 of inherent viscosity of approximately 1.45 in m-cresol and plasticized with 12.5 mass % of n-butylbenzenesulphonamide (BBSA), the surface resistivity changes little above 9 mass % (beginning of the resistivity plateau region) of carbon black (KETJENBLACK® EC 600 JD carbon black from Akzo Nobel, characterized by a pore volume of 400 ml of dibutyl phthalate per 100 g of carbon black and by a specific surface area of 1250 $m^2/g$, measured by the nitrogen absorption method (BET method)).

However, these pipes made of antistatic polyamide no longer meet the new requirements of motor vehicle manufacturers with regard to permeability. With the increasingly frequent addition of methanol to petrol or gasoline, the sensitivity of the polyamide pipes manifests itself as swelling of the pipe, entailing a decrease in the mechanical properties and dimensional changes.

To overcome this disadvantage, while retaining the mechanical effects of the polyamides, it has been proposed in EP 558373 to sheathe the inner wall of the polyamide pipe with a layer of fluoropolymer, preferably polyvinylidene fluoride (PVDF), the fluoropolymer layer being preferably as thin as possible in order to preserve the flexibility of polyamide as much as possible, it being known that fluoropolymers, and especially PVDF, are not particularly renowned for their properties in respect of suppleness. However, once filled with carbon black, PVDF has very poor impact strength, especially at low temperature, and this solution is therefore unsatisfactory.

Another alternative, proposed in WO 94/29626, consists of a polyamide-based pipe made up of an outer layer of polyamide, a middle layer of fluoropolymer, preferably of PVDF, and an inner layer of polyamide, these layers being bonded to each other respectively by layers of adhesive binder. However, when the PA-based inner layer is filled with carbon black in proportions corresponding to the resistivity plateau region, the PA-adhesive binder adhesion is virtually nil.

This absence of adhesion is all the more surprising since, when carbon black is replaced with another reinforcing filler such as, for example, calcium carbonate (OMYALITE® 90T from Omya) in the same mass proportion, this new composition based on the same polyamide 12 has an excellent adhesion in coextrusion or in pressing films onto a coextrusion binder.

SUMMARY OF THE INVENTION

The present invention relates to antistatic and adherent compositions based on polyamide, which can be employed especially for the manufacture of composite materials and articles, such as multilayer pipes and/or conduits for conveying and/or storing hydrocarbons. The compositions contain carbon black and are employed for the production of pipes, containers and drums including:

an inner layer in contact with the hydrocarbons, based on the said antistatic and adherent composition, a middle layer made of fluoropolymer, preferably of polyvinylidene fluoride, and an outer layer of polyamide, these layers being bonded to each other respectively by layers of adhesive binder. The invention also relates to a process for preparing these items.

DETAILED DESCRIPTION OF THE INVENTION

Figure 1:
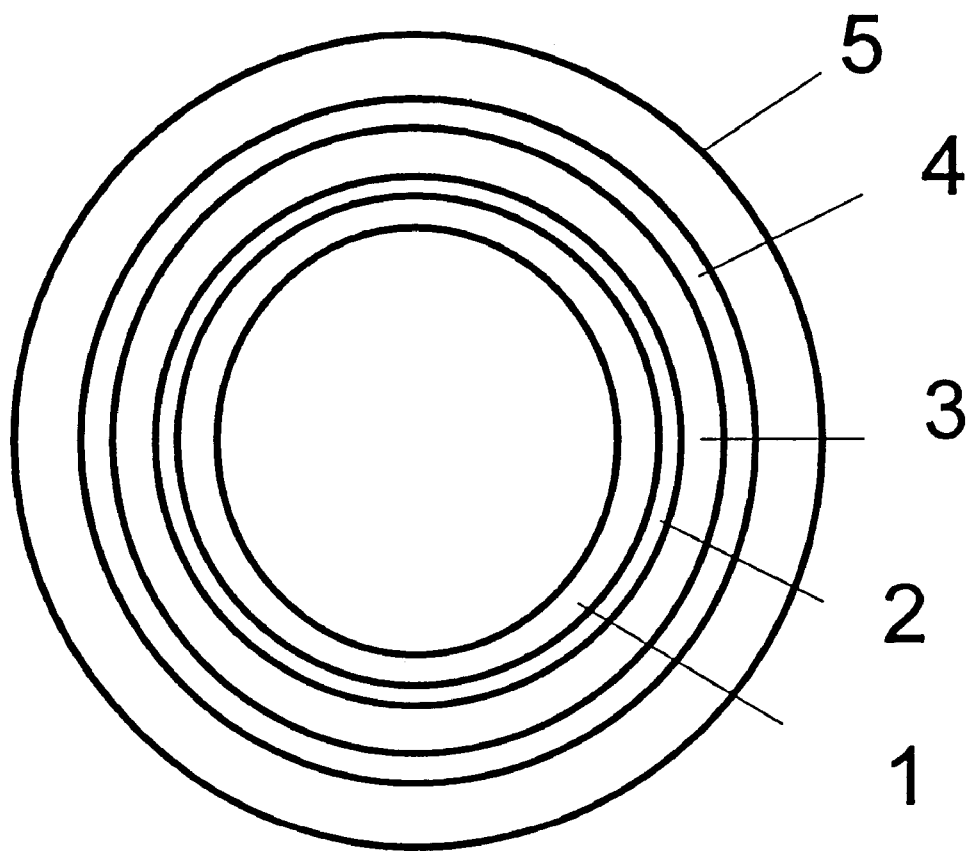

The applicants have developed polyamide-based compositions which are antistatic, i.e. with a surface resistivity lower than or equal to $10^6$ Ω, and which are capable of adhering with the adhesive binders for fluoropolymers. The compositions according to the invention are characterized in that they include a sufficient quantity of carbon black to adhere with the adhesive binders for fluoropolymers and to have a surface resistivity lower than or equal to $10^6$ Ω.

It is, in fact, vital that the fluoropolymer, and especially the PVDF, should be bonded efficaciously to the polyamide. Thus, a pipe that does not have a bond between the fluoropolymer and the polyamide cannot have good flexibility and consequently cannot be easily folded or bent by hot forming; in this case the thinnest material forms wrinkles during the operation.

Furthermore, if the layers do not adhere to each other, possible condensation of vapor between two fluoropolymer/polyamide layers can, in time, result in distortion of the thinnest part of the pipe. In addition, since the pipes are joined together, as well as to the petrol tank and to the carburetor, by couplings, the latter cannot ensure leak-tightness if they bear on separated layers. Finally, in the case where the fluoropolymer is PVDF and when the thickness of the PVDF layer inside the pipe is very small, for example from about 10 μm to about 30–90 μm, and without adhesion, a partial vacuum in the pipe irreversibly distorts the polyvinylidene fluoride film, making the pipe unusable.

Within the meaning of the present invention adhesive binders are intended to mean thermoplastic compositions based on one or more polymers containing chemical functional groups that are reactive towards the chain ends of polyamides, like, for example, anhydride, acid or epoxy groups. These groups may be introduced into the binder as a comonomer of the polymer(s) present in the thermoplastic composition or by grafting onto the polymer(s) present in the thermoplastic composition. Among these binders, those more particularly adopted are the binders described in EP 558373, WO 94/25524, WO 94/29626 and EP 637511, permitting the adhesion of polyamides and of fluoropolymers.

Polyamide or PA is intended to mean thermoplastic aliphatic polyamides or nylons and especially polyamide 11 (PA-11), polyamide 12 (PA-12) or polyamide 12,12 (PA-12, 12), whether plasticized or otherwise, or else polyamide 6 (PA-6) or polyamide 6,6 (PA-6,6). The PA may optionally be a product which has been modified to improve its impact strength and/or may be a copolymer and/or a mixture of polymers. The PA may also contain fillers, other than carbon black, and/or additives for polyamides. The quantity of filler, other than carbon black, and/or additive which is incorporated is conventional and is a function of the specification of the motor vehicle manufacturer. According to one embodiment, this filler consists of a regrind. This term "regrind" refers to the milled product of a pipe which has been badly formed during the manufacturing process and is thereby unsuitable for the use for which it is intended, and which is therefore recycled. These badly formed pipes can therefore be ground up and incorporated into the inner and/or outer layer.

Among the fluoropolymers of the invention there may be mentioned:

vinylidene fluoride (VF2) homo- and copolymers, trifluoroethylene (VF3) homo- and copolymers, homo- and copolymers, and especially terpolymers, combining residues of chlorotrifluroethylene (CTFE), tetrafluoroethylene (TFE), hexafluoropropene (HFP) and/or ethylene units and optionally VF2 and/or VF3 units.

To give an example, polytetrafluorethylene (PTFE) and poly(ethylene-tetrafluoroethylene) (ETFE) may be mentioned. Fluoropolymer is also intended to mean mixtures of at least 70% by weight of the above with other polymers.

Among the fluoropolymers, those advantageously employed are vinylidene fluoride homo- and copolymers which have at least 70% by weight of VF2 residues, referred to as PVDF throughout the text. PVDF is also intended to mean mixtures of the above with at least one other thermoplastic polymer, on condition that at least 50% by weight of VF2 units are present in the mixture.

The invention also relates to the process for the preparation of the antistatic and adherent compositions defined above. The PA in the molten state may be mixed with the additives, optional fillers and carbon black in proportions corresponding exactly to those of the desired composition but, as indicated above, this method makes it necessary to measure very precisely the quantity of carbon black to be added, because the operation is performed before the resistivity plateau region.

To prepare the compositions according to the invention, the applicants have developed a two stage process, in which a first composition is prepared firstly by adding carbon black to a polyamide such that the resistivity level of the composition is within the resistivity plateau region, this composition corresponding to an antistatic (but generally non-adherent) master mix, and then this master mix, the precise carbon black content of which has been measured beforehand, is "diluted" with polyamide substantially free of carbon black, for example by extrusion, so as to obtain a composition within the meaning of the present invention.

All or part of the additives and/or fillers (excepting carbon black) can be incorporated during this "dilution" stage.

Another subject of the invention is a composite material including successively at least the combination: adherent and antistatic composition based on PA/adhesive binder/fluoropolymer, where the PA-based composition, the binder and the fluoropolymer are as defined above. These composite materials may be, for example, multilayer materials such as films, in which the following are found in succession:

a layer of adherent and antistatic composition based on PA, a layer of adhesive binder, a layer of fluoropolymer.

The composite material may be formed by the method of coextruding, the method of pressing of films, or a combination of these methods. The pressing of films can be accomplished by compression molding as is well known to those skilled in the polymer processing arts.

Among the composite materials, very particular mention will be made of manufactured articles such as multilayer pipes, as well as of multilayer containers and drums obtained especially by blow-coextrusion, for conveying and/or storing hydrocarbons and especially petrol, including:

an inner layer based on an antistatic and adherent composition as defined above, a middle layer made of fluoropolymer, preferably of PVDF, and an outer layer of polyamide, these layers being bonded to each other respectively by layers of adhesive binder.

The polyamides of the outer and inner layers may be identical or different. Each polyamide layer may be made up of one or more sublayers, each of these sublayers being made up of a different polyamide. Each layer of fluoropolymer may be made up of one or more sublayers, each of these sublayers being made up of a different fluoropolymer. Each layer of binder may be made up of one or more sublayers, each of these sublayers being made up of a different binder.

According to one embodiment, the thickness of the polyamide layers is between 0.3 mm and 1.8 mm, the thickness of the fluoropolymer layer is between 10 μm and 1 mm and the thickness of the layers of adhesive binder is between 10 μm and 1 mm.

The thicknesses of the polyamide and binder layers may be identical or different. Such thicknesses of the constituents are appropriate for the manufacture of engine petrol feed pipes, the diameter of which is generally between 6 mm and 12 mm.

The invention also relates to pipes which are identical with the above except for their larger diameter. They are suitable, for example, for connecting the buried petrol storage tank to the pump in service stations.

The manufactured articles, such as pipes, may be formed by the method of coextruding, the method of pressing of films, or a combination of these methods.

Pipes according to the invention are obtained in a known manner by coextrusion of the five components in known extrusion conditions which are specific to each of the thermoplastic materials. The coextrusion of the five components facilitates the extrusion of the middle layer of fluoropolymer, especially of PVDF, which is relatively difficult when this layer is not "sandwiched".

FIG. 1 corresponds to a 5-layer pipe for conveying petrol, which is particularly preferred by the applicants. The pipe comprises:

- an inner layer (1) of thickness equal to approximately 200 $\mu$m, based on PA-12 which is antistatic and adherent to
- a layer of binder (2) (as described in WO 94/25524) of approximately 80 $\mu$m thickness, adhering to
- a layer of PVDF (3) sold by Elf Atochem S.A. under the trade name KYNAR® 6000 HD of approximately 120 $\mu$m thickness, and adhering to
- a layer of binder (4) (as described in WO 94/25524) of approximately 80 $\mu$m thickness, adhering to
- an outer layer based on PA-12 (5) sold by Elf Atochem S.A. under the trade name MA 4411 of approximately 520 $\mu$m thickness.

EXAMPLES

In all that follows, and unless indicated otherwise, the proportions are proportions by mass.

Materials:

PA#1 is a PA-12 plasticized with 7.5% of n-butylbenzenesulphonamide (BBSA) which has a flexural modulus of 450 MPa (by ISO standard 178) and a notched Charpy impact strength of 9 kJ/m$^2$ at −40° C. (by ISO standard 179).

The adhesive binder is a mixture obtained by extrusion on a twin-screw extruder, including 50 mass % of polyvinylidene fluoride homopolymer with a melt index of 13 g/10 min at 230° C. under 5 kg (by ISO standard 1133), 15 mass % of a copolymer of acrylic-imide type containing acid and anhydride groups in its structure and characterized by a flexural modulus of 4,100 MPa (by ISO standard 178) and 35 mass % of a methyl methacrylate-butadiene-styrene (MBS) impact modifier of core-shell type. The copolymer of acrylic-imide type is marketed by Rohm & Haas under the name EXL 4,000 and by Röhm GmbH under the name FLEXIMID.

PA#2 through PA#6 are compositions based on PA-12 plasticized with 12.5% of n-butylbenzenesulphonamide (BBSA) and containing electrically conductive carbon black as well as 7% of thermoplastic elastomer based on polyether-block-amide (PEBA) of Shore D hardness equal to 40 and with a melting point of 147° C.

The electrically conductive carbon black used has a pore volume of 400 ml of dibutyl phthalate per 100 g of carbon black and has a specific surface area of 1250 m$^2$/g, measured by the nitrogen adsorption method (BET method), reference KETJENBLACK® EC600JD from Akzo Nobel. The mass percentage of black introduced is:

11.1% in the case of PA#2
9.4% in the case of PA#3
8.6% in the case of PA#4
6.5% in the case of PA#5
0% in the case of PA#6

Preparation of the compositions based on PA#2 through PA#6 on an extruder:

In a conventional manner, the plasticized polyamide and polyether-block-amide granules are introduced, after mechanical mixing, into the feed hopper of an extruder of the Buss Ko-kneader® type. The carbon black is introduced into the melt zone with the aid of a forced-feed hopper. The extrusion stock temperatures are typically of the order of 245 to 260° C. The kneader screw speed is 285 rev/min, while the extruder discharge screw speed is 33 rev/min. The throughput is from 15 to 20 kg/h.

Preparation of pipes by coextrusion:

The coextrusion line employed allows pipes comprising 1, 2, 3, 4 or 5 layers to be produced equally well. The pipes produced are calibrated to the following sizes: external diameter approximately 8 mm, internal diameter approximately 6 mm. They comprise three layers:

- an outer layer (PA#1) of 770 $\mu$m thickness; feeding of this layer is by a single-screw extruder of 45 mm diameter, with a screw head temperature of the order of 230° C.
- a layer of binder (L) of 80 $\mu$m thickness; feeding of this layer is by a single-screw extruder of 25 mm diameter, with a screw head temperature of the order of 250° C.
- an inner layer (PA#2 to PA#6) of 150 $\mu$m thickness; feeding of this layer is by a single-screw extruder of 30 mm diameter, with a screw head temperature of the order of 245° C.

The screw speeds are chosen so as to ensure the distribution of the desired layers.

Testing:

The peeling tests on a pipe (adhesion between the layers of the multilayer structure) are performed in the following manner:

The sample is cut from a 6×8 mm (internal×external diameter) pipe with the aid of a device which makes it possible to plane a strip 20 cm in length by 6 mm in width. After initiation with the aid of a razor blade, the peel strength is measured with the aid of a tensometer at a speed of 200 mm/min and a peeling angle of 180°. The adhesion is reported in kg/cm. The following correspondence is employed:

| | |
|---|---|
| Interfacial Adhesion > 6 kg/cm | +++ |
| | Excellent |
| 2 kg/cm < Interfacial Adhesion < 6 kg/cm | ++ |
| | Average |
| Interfacial Adhesion < 2 kg/cm | 0 |
| | Nil |

Measurements of surface resistivity are performed on pipes according to the test described in the standard GM213M: Two cylindrical copper electrodes are introduced into the ends of a pipe 100 mm in length. A voltage adapted to these electrodes is applied and the current is measured. The resistance thus measured (crude measurement) is then multiplied by the internal circumference of the pipe and then divided by the distance between the electrodes; the surface resistivity is obtained and expressed in ohms ($\Omega$).

The following results are obtained for the various pipes:

| Structure | (Inner Layer)/ Binder Adhesion | Binder/(Outer Layer) Adhesion | Surface Resistivity (Ω) |
|---|---|---|---|
| PA#1/L/PA#1 | +++ | +++ | >$10^{13}$ |
| PA#1/L/PA#2 | 0 | +++ | $10^2$–$10^3$ |
| PA#1/L/PA#3 | 0 | +++ | $10^2$–$10^3$ |
| PA#1/L/PA#4 | 0 | +++ | $10^2$–$10^3$ |
| PA#1/L/PA#5 | ++ | +++ | $10^5$–$10^6$ |
| PA#1/L/PA#6 | +++ | +++ | >$10^{13}$ |

According to the above table, the composition called PA#5 corresponds to the most preferred composition of the invention.

What is claimed is:

1. An antistatic and adherent composition comprising polyamide, characterized in that the composition further comprises from 4.5% to 8% by weight of carbon black wherein the composition is simultaneously antistatic and adherent to at least one adhesive binder for fluoropolymers.

2. The composition of claim 1, characterized in that the composition is simultaneously antistatic and adherent to at least one adhesive binder for polyvinylidene fluoride.

3. The composition of claim 1, further characterized in that it comprises at least one polyamide selected from the group consisting of PA-12, PA-11 and PA-12,12.

4. The composition of claim 1 further comprising a plasticizer.

5. The composition of claim 1 comprising PA-12 with an inherent viscosity of approximately 1.45 in m-cresol, characterized in that the carbon black has a specific surface area of 1250 m²/g and a pore volume of 400 ml of dibutyl phthalate per 100 g of carbon black.

6. The composition of claim 5 comprising from 5.5% to 6.5% by weight of carbon black.

7. A process for the preparation of an antistatic and adherent composition comprising polyamide, characterized in that the composition further comprises 4.5% to 8% by weight of carbon black to be simultaneously antistatic and adherent to an adhesive binder for fluoropolymers, said process occurring in two stages, characterized in that in the first stage, a first composition is prepared by adding carbon black to a polyamide in a sufficient quantity such that the resistivity of the first composition is substantially identical to plateau region resistivity; and in the second stage, diluting the first composition, the precise carbon black content thereof having been measured beforehand, with a polyamide substantially free of carbon black.

8. A composite material comprising at least these successive layers:

the composition of claim 1, an adhesive binder, and a fluoropolymer.

9. The composite material of claim 8 wherein the fluoropolymer comprises polyvinylidene fluoride.

10. An article of manufacture selected from the group consisting of multilayer pipes, containers and drums for conveying hydrocarbons, characterized in that the article comprises:

an inner layer in contact with the hydrocarbons, comprising the composition of claim 1, a middle layer comprising a fluoropolymer, and an outer layer comprising a polyamide, wherein the layers are bonded to each other by layers of an adhesive binder.

11. The article of manufacture of claim 10 wherein the middle layer comprises polyvinylidene fluoride.

12. The article of manufacture of claim 10 wherein the outer layer comprises at least one polyamide selected from the group consisting of PA-11, PA-12 and PA-12,12.

13. The article of manufacture of claim 12 wherein the outer layer comprises PA-12.

14. The article of manufacture of claim 10 wherein the inner layer comprises at least one polyamide selected from the group consisting of PA-11, PA-12 and PA-12,12.

15. The article of manufacture of claim 14 wherein the inner layer comprises PA-12.

16. The article of manufacture of claim 10 wherein the adhesive binder comprises at least one material selected from the group consisting of polyvinylidene fluoride homopolymer, a copolymer of the acrylic-imide type comprising acid and anhydride functional groups, and a methyl methacrylate-butadiene-styrene (MBS) impact modifier of the core-shell type.

17. A process for forming the composite material of claim 8 whereby the composite material is formed by at least one method selected from the group consisting of coextruding and pressing a film, wherein the film comprises an antistatic and adherent composition layer comprising polyamide, characterized in that the composition further comprises a sufficient quantity of carbon black to be simultaneously antistatic and adherent to at least one adhesive binder for fluoropolymers; an adhesive binder layer; and a fluoropolymer layer.

18. A process for forming the article of manufacture of claim 10 whereby the article of manufacture is formed by at least one method selected from the group consisting of coextruding and pressing a film, wherein the film comprises an inner layer in contact with hydrocarbons, comprising an antistatic and adherent composition layer comprising polyamide, characterized in that the composition further comprises a sufficient quantity of carbon black to be simultaneously antistatic and adherent to at least one adhesive binder for fluoropolymers; a middle layer comprising a fluoropolymer; and an outer layer comprising a polyamide, and wherein each layer is bonded to the adjacent layer by an adhesive binder.

19. The process of claim 7, wherein the polyamide is PA-12 with an inherent viscosity of approximately 1.45 in m-cresol, and wherein the carbon black has a specific surface area of 1250 m²/g and a pore volume of 400 ml of dibutyl phthalate per 100 g of carbon black.

20. The process of claim 19, wherein the carbon black comprises from 5.5% to 6.5% by weight of the composition.

* * * * *